May 15, 1923.  
A. J. ARBUCKLE  
MEANS FOR SEPARATING THE LIQUID AND SOLID COMPONENTS OF MIXTURES OF LIQUIDS AND SOLIDS  
Filed Aug. 12, 1922  
1,454,916  
3 Sheets-Sheet 2
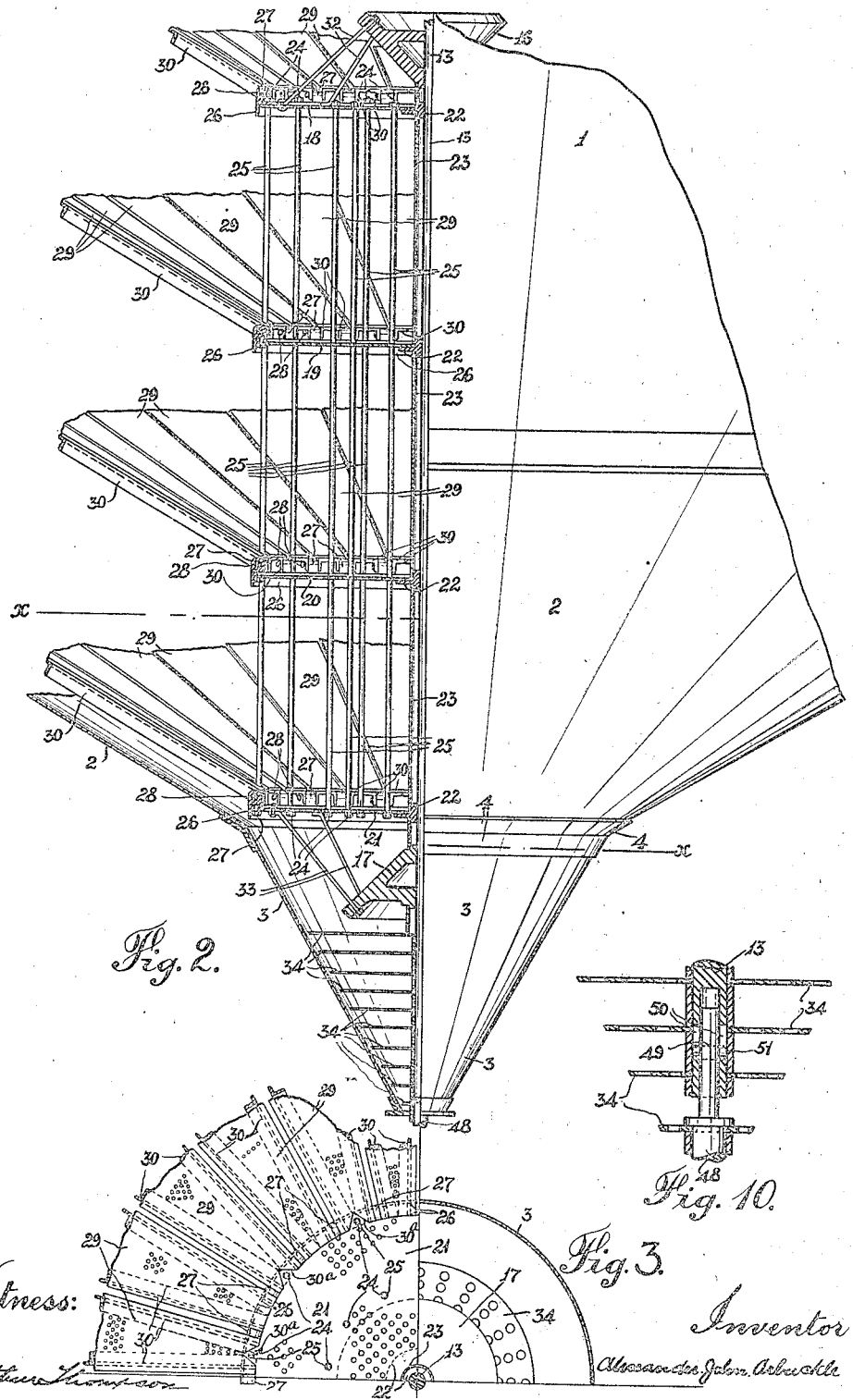

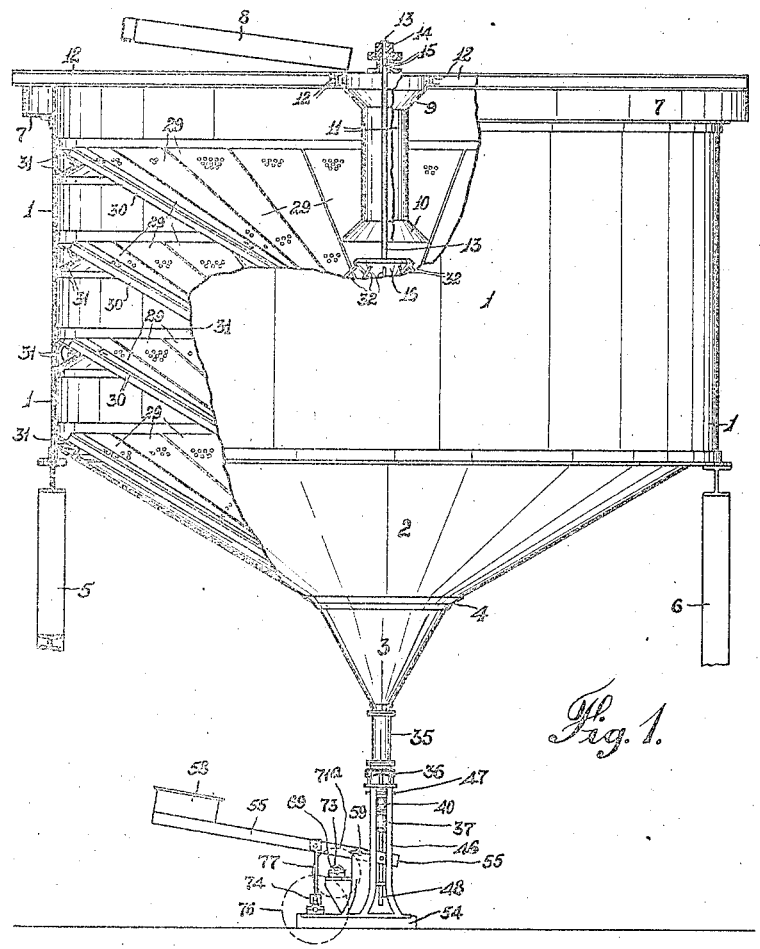
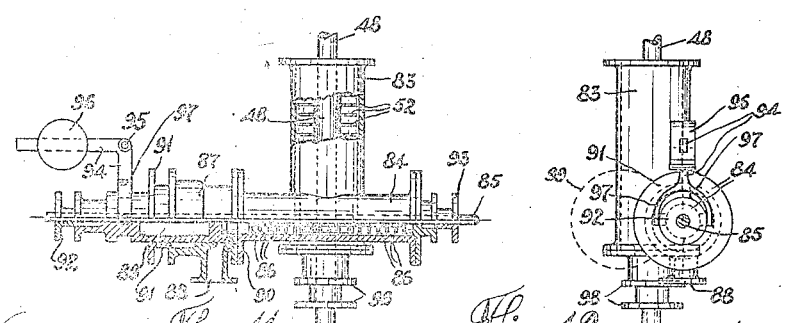

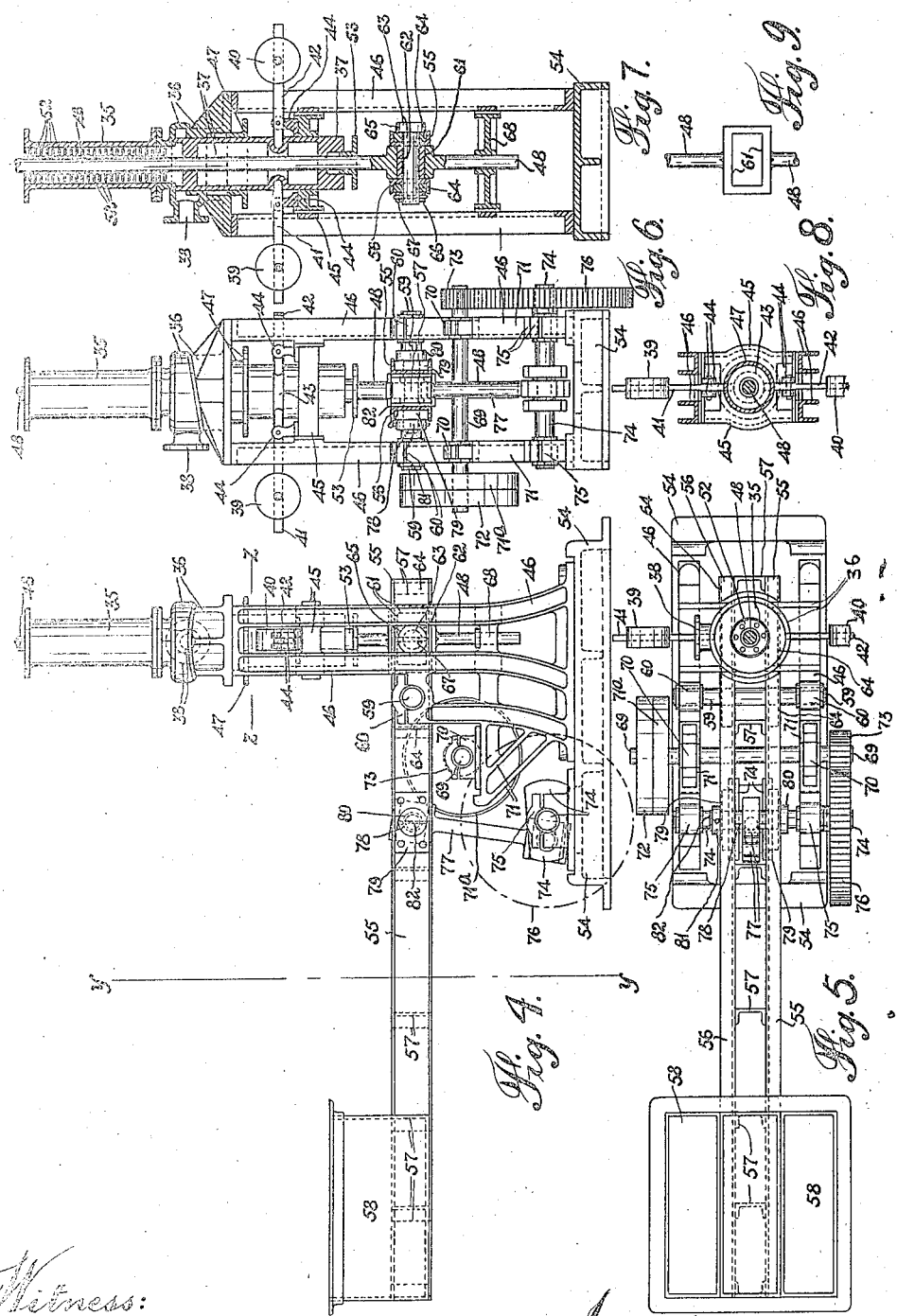

Patented May 15, 1923.

1,454,916

UNITED STATES PATENT OFFICE.

ALEXANDER JOHN ARBUCKLE, OF JOHANNESBURG, TRANSVAAL, SOUTH AFRICA.

MEANS FOR SEPARATING THE LIQUID AND SOLID COMPONENTS OF MIXTURES OF LIQUIDS AND SOLIDS.

Application filed August 12, 1922. Serial No. 581,386.

*To all whom it may concern:*

Be it known that I, ALEXANDER JOHN ARBUCKLE, a subject of the King of Great Britain, and resident of Johannesburg, in the Transvaal Province of the Union of South Africa, have invented certain new and useful Improvements in Means for Separating the Liquid and Solid Components of Mixtures of Liquids and Solids, of which the following is a specification.

This invention relates to apparatus for separating the liquid and solid components of mixtures of liquids and solids, such as the liquid and solid components of mixtures of liquids and crushed or ground ore products, and more particularly for separating the solvent solutions and wash water from comminuted ores.

The invention relates to apparatus or means substantially of the kind described in Patent No. 1,422,514, granted to me on the 11th day of July, 1922, and it relates to the construction, arrangement and operation of the means provided in the tank or vessel for promoting the settlement of the solid constituent, and to the construction, arrangement and operation of the means for removing the separated solid constituent from the bottom of the treatment or settling tank or vessel.

In my aforementioned application means are described in the form of a horizontal conveying arrangement for removing or withdrawing the settled solid component from the bottom of the settling vessel and a vertical or inclined conveying arrangement for elevating the same to a suitable height for discharge.

The invention will be fully described with the aid of the accompanying drawings, wherein—

Fig. 1 is a part-sectional elevation of a settling tank equipped with the means for promoting the settlement of the solid constituent, and one form of the means for removing the separated settled solids from the bottom of said tank.

Fig. 2 is a part-sectional elevation of portion of the bottom of the vessel, illustrating to an enlarged scale, portions of the means for promoting settlement of the solid component, and those parts of the discharging means which are arranged in the conical bottom of the settling vessel.

Fig. 3 is a sectional plan of Fig. 2 on line $x$—$x$.

Fig. 4 is an elevation of that portion of the means, shown in Fig. 1, for removing the settled solids, which is attached to the bottom of the tank, and the means for actuating the settling and discharging arrangements, drawn to an enlarged scale.

Fig. 5 is a plan of Fig. 4.

Fig. 6 is a sectional elevation of Fig. 4 on line $y$—$y$.

Fig. 7 is a vertical sectional elevation of Fig. 4, taken centrally through the discharging means.

Fig. 8 is a sectional plan of Fig. 4 on line $z$—$z$.

Fig. 9 is a view illustrating a detail in the construction of the vertical driving rod of the discharging means.

Fig. 10 is an enlarged detail of portion of the driving rod of the discharging means and the lifting rod of the settling means, illustrating a method of connecting the same.

Fig. 11 is a part-sectional elevation illustrating a modified construction of the means attached to the bottom of the tank for discharging the separated and settled solids, and Fig. 12 is an end elevation of Fig. 11.

Referring more particularly to Figs. 1, 2 and 3 of the drawings, in which the means for promoting the settlement of the solid constituent of the mixture is illustrated, the numeral 1 denotes the cylindrical portion of the settling tank or vessel, 2 the inverted conical lower portion thereof, and 3 the smaller inverted conical bottom portion which is affixed to the part 2 of the bottom by means of the ring 4, and which inverted cone 3 constitutes the housing for the upper portion of the solids discharging arrangement. 5, 6, are the supports for the tank 1, 2, 7 the annular overflow or rim launder, 8 the launder down which the pulp or mixture of solids and liquids flows to the inlet or feed pipe comprising the upper and lower conical portions 9, 10, and the cylindrical intermediate portion 11; 12 being beams or girders from which the inlet or feed pipe is suspended centrally of the vessel 1.

A rod or shaft 13, which is disposed vertically and centrally of the tank 1, serves for actuating the means which is arranged in the portion 1, 2, of the tank for promoting the settlement of the solid component of the mixture, and the upper portion of the means for discharging the separated and solid component from the conical bottom portion 3 of the tank.

The upper portion of the rod 13 extends through the feed or inlet pipe 9, 10, 11, and works through a guide bearing 14 carried by channel irons 15 arranged and fixed upon the top of the beams or girders 12, above said pipe. On the rod 13, below the cone 10 of the inlet pipe, there is fixed a conical piece or casting 16, and on said rod 13, in the inverted conical bottom portion 3 of the tank there is fixed another similar piece or casting 17. On the rod 13, between the pieces or castings 16, 17, there are arranged a plurality (four 18, 19, 20, 21, are shown) of perforated circular plates or discs, which are maintained at the requisite distance apart by means of flanges 22 fixed on the rod, and tubular distance pieces 23 beween the flanges 22. The several perforated horizontal plates 18, 19, 20, 21, are connected together and stayed by means of vertical rods or bolts 24, passing from the bottom to the top and having tubular distance pieces 25 placed around them between the several plates 18, 19, 20, 21, so that they support the intermediate perforated plates 19, 20, from the top and bottom plates 18, 21. The perforated plates 18, 19, 20, 21, are strengthened by angle iron rings 26 placed around the periphery. To the rings 26 and plates 18, 19, 20, 21, at the requisite distances apart around the periphery, there are fixed eyebolts 27 which have hingedly attached to them, by pins 28, the lower ends of inclined perforated settling plates 29. The plates 29, as shown, are fixed upon angle iron supporting members 30 along their inclined radial edges, which members engage the hinge pins 28 at the sides of the eyebolts 27—see Figs. 2 and 3.

In the arrangement illustrated in Figs. 1, 2 and 3, four sets or groups of the inclined settling plates 29 are shown, but it is to be understood that one only, or any other suitable number of such sets or groups may be employed. Each set or group consists of the requisite number of inclined plates, tapered from the upper to the lower edge, with a small amount of space between them so as to allow of the movement of the plates in an upward and downward direction, as hereinafter explained. The plates 29 of each set or group, when assembled, form an inverted, truncated, segmental cone, the segments of which are adapted to move independently and apart along their inclined edges when the group or set is lifted by virtue of its connection with the perforated plates 18, 19, 20 or 21, to which they are attached. As is shown at 30$^a$ in Fig. 3, the lower ends of the plates 29 are cut away or shaped so as to clear the vertical rods or bolts 24 and distance pieces 25.

The upper and outer ends of all the inclined perforated settling plates 29 of each group or set rest upon an internal flange or annular projection 31 connected to the inside of the tank, which form inclined supports upon which the upper ends of the plates 29 are adapted to slide when the settlement promoting means is raised and lowered in the tank or vessel 1, 2, during which operation the lower ends of the plates 29 move on their hinges or pivots 28, the spacing apart of the plates 29, as previously explained, allowing of this upward and downward movement.

As shown in Figs. 1, 2 and 3, in the case of a cylindro-conical tank, the various groups or sets of the perforated settling plates 29 are superimposed or arranged in tiers and are operated simultaneously by the central vertical rod or shaft 13 through their respective plates 18, 19, 20, 21, and the vertical rods or bolts 24 and their distance pieces 25. The upper perforated circular plate or disc 18 may be additionally supported by means of stays 32 from the piece or casting 16, and in like manner the lower perforated plate 21 may be stayed by the stays 33 from the lower casting 17.

Any suitable portion of the area of the plate 29 may be perforated and the holes be of any suitable size and placed at any suitable distance or distances apart; and in like manner, any portion of the surfaces of the several plates 18, 19, 20, 21, may be perforated with holes of the same or different size and arrangement, said holes being of larger size than those formed in the plates 29.

The solids which settle and are collected on the surfaces of the various groups or sets of inclined plates 29, and the plates or discs 18, 19, 20, 21, pass or fall through the perforations in said plates 29, and through the perforations in the plates 18, 19, 20, 21, and are ultimately collected and accumulate in the inverted conical portion 3 of the bottom. The separated liquid passes out of the tank or vessel by the overflow rim launder 7.

On the rod or shaft 13 below the piece or casting 17 and in the inverted truncated conical portion 3 of the bottom of the vessel, there is arranged a number of perforated plates or discs 34 of gradually decreasing diameter from the uppermost to the lowermost. These perforated plates 34 extend to and work within a short distance of the side of the inverted conical portion 3 and operate to displace or push the settled solids out of the cone 3 into a pipe or hollow cylinder 35.

Beneath the lower end of pipe or hollow cylinder 35 there is arranged and attached a casting or port 36 which forms a housing for a valve or valve device 37—see Figs. 1 and 4 to 9. The valve 37 which controls the outflow of the solids through the outlet 38 in the casting 36, is held in a closed position (in which position it is shown in Fig. 7) by means of two adjustable weights 39, 40, operating levers 41, 42, which at their inner ends engage in a groove 43 formed around the plunger or valve 37, and are fulcrumed on pivots carried by brackets 44, carried by a further bracket 45 which serves as a guide for the lower portion of the plunger or valve 37. The guide bracket 45 is fixed in a main frame or pedestal 46 upon the upper end of which the casting 36 is secured. 47 is a gland fitted in the casting 36 around the plunger or valve 37.

A rod or shaft 48 which extends through the plunger or valve 37 and the pipe or cylinder 35 is connected with the lower end of the rod or shaft 13. The connection between the shafts 48 and 13, as shown more particularly in Fig. 10, is made by forming a hole or recess 49 in the bottom of the shaft 13 and forming a slot 50 through the shaft which passes through the hole 49. Into the hole 49 the upper end of the shaft 48 is projected and a pin 51 is fixed in said upper end in such a position that it works in the slot 50. This construction allows the rod or shaft 48 to be lifted a short distance before the solids settling means is raised.

On the upper end of the rod or shaft 48 there is fixed a number of perforated discs or circular plates 52 of uniform diameter and of slightly less diameter than the internal diameter of the pipe 35—see Figs. 5 and 7. These discs or plates 52 are spaced apart along the length of the upper portion of the rod or shaft 48 by tubular distance pieces and operate within the pipe or hollow cylinder 35 to force or move the settled solids in a downward direction from the cone 3 to and through the outlet 38 when the valve 37 is opened; the valve 37 being moved downwards to open the outlet 38 when the pressure of the solids overcomes the action of the weights 39, 40, on said plunger or valve 37.

When the rod or shaft 48 is moved upwards by the means hereinafter described, the effect is, firstly, to force or cause portion of the solids to pass through the holes in the discs 52 whilst the solids settling means is stationary and due to the weight of the settled solids in the tank, then to raise the solids settling means in the tank. On the downward movement of the rod or shaft 48, the solids settling means is able to fall and in doing so the discs or plates 34 force a further quantity of the solids out of the cone 3 into the pipe or hollow cylinder 35, and in conjunction with the discs or plates 52 discharge a quantity of the solids through the outlet 38.

A gland 53 is fitted to the lower end of the plunger or valve 37 around the rod or shaft 48.

The frame or pedestal 46 is shown—see Figs. 4 to 7 of the drawings—arranged upon a sole or base plate 54 upon which it is bolted or otherwise suitably fixed.

The means for actuating the settling and discharging arrangements operating in the tank 1, 2, cone 3, and pipe or hollow cylinder 35, through the medium of the rods or shafts 48, 13, is shown consisting of a beam built up of two channel iron girders 55, 56, tied together by cross pieces 57. The beam at one end carries a weight box 58, constructed to carry a weight or weights of suitable magnitude which is sufficient to counterbalance the weight of the parts of the settling and discharging means.

The beam 55, 56, is fulcrumed at 59, the pivot pin being shown carried in bearings 60 provided by the frame 46 so as to place the fulcrum of said beam 55, 56, at a suitable distance from the lower end of the vertical rod 48 in frame 46.

As shown in Fig. 9, the lower end of rod 48 is fashioned to form a rectangular slot 61 in which is arranged a block or crosshead 62 which carries a pin 63. The pin 63—see Fig. 7—projects at the ends through holes formed in the channel irons 55, 56, and filling pieces 64 fitted in the channel irons. The pin 63 is retained in position between the channel irons 55, 56, by a head 65 formed on one end of said pin and a collar 66 secured on the other end thereof by a cotter pin 67. The block or crosshead 62 being adapted to move in the slot 61 compensates for the radial movement of the beam about the fulcrum 59 and allows of the vertical movement of the rod or shaft 48.

68 is a guide provided in the frame 46 for the lower end of the rod 48 below the crosshead 62.

The beam 55, 56 may be rocked or oscillated by hand or by any suitable form of power. The driving means shown includes a shaft 69 journalled in bearings 70 carried by brackets 71 formed on the frame 46. 71ª, 72 are fast and loose pulleys on one end of shaft 69, and 73 a pinion on the other end of said shaft. 74 is a crank shaft which is journalled in bearings 75 mounted on the sole plate 54 at one side of the main frame 46. 76 is a spur wheel on the one end of crank shaft 74 which meshes with and is driven by the pinion 73. 77 is a connecting rod which at one end engages with the crank of the crank shaft 74 and at the other end engages with a pin 78 which is fixed between the channel irons 55, 56, and is secured therein and in filling pieces 79 between the head 80 provided on one end of said pin and a collar 81 fixed by cotter pin 82 on the other end thereof.

When the beam 55, 56, is oscillated or rocked about its fulcrum 59 by the movement of the connecting rod 77, off the crank shaft 74, that end of the beam which engages with the rod 48 raises and lowers the latter and so actuates the settling and discharging means in the manner previously explained.

In the modified construction of the means for controlling the discharge of the settled solids from the bottom of the tank—see Figs. 11 and 12—the tube or hollow cylinder 83 in which works the vertical rod or shaft 48, on which are provided the perforated discs 52, is shown constructed integral with the horizontal intercommunicating barrel portion 84 with which the hollow cylinder 83 communicates at the bottom. The horizontal barrel or casing 84 is provided with a conveying arrangement comprising a shaft 85, on which shaft and within the horizontal barrel or casing 84 there is arranged a number of the perforated discs 86 which are spaced apart along the length of the shaft 85 in the same manner as the discs 52 are arranged on shaft or rod 48. The shaft 85 may be driven by suitable means at either end thereof, and in such manner that the conveying arrangement in the horizontal barrel 84 is moved through its instroke when the shaft 48 is moving through its downstroke, said shaft being moved on its out and delivery stroke when the shaft 48 is moving through its upstroke. The casting or part 87 which provides the outlet 88 for the discharged solids is fixed to the delivery end of barrel 84 and forms a housing for the cylindrical valve device or plunger 89, which is constructed with an annular knife edge 90, adapted to co-operate with a V-shaped seat in the casting or housing 87. 91 is a gland fitted to the casting 87 around the plunger or valve 89. 92, 93 are glands provided around the shaft 85 at the ends of the plunger or valve device 89 and the barrel 84, respectively. 94 is the lever fulcrumed at 95 and provided with an adjustable weight 96, and forked or shaped, as indicated at 97, to engage with the plunger or valve 89 yieldingly to maintain the same in its closed position.

98 is a stuffing box and gland provided at the lower end of the hollow cylinder 83 through which gland the rod or shaft 48 works.

The valve device is opened to allow the solids to pass out through the outlet 88 by the pressure of the solids against its inner end due to the action of the horizontal conveying device 85, 86.

As indicated by the dotted circle 99 in Fig. 12, two of the barrels 84 may be provided and placed at opposite sides of the lower portion of the hollow cylinder or vertical casing 83, and each of said barrels 84 be provided with a horizontal conveying arrangement and a co-operating valve constructed, arranged and operated in the manner described in connection with Figs. 11 and 12.

What I claim as my invention and desire to protect by Letters Patent is:—

1. Apparatus for separating the liquid and solid components of mixtures of liquids and solids, comprising, in combination, a settling vessel, means for removing or discharging the settled solids therefrom including a casing which is in communication with the bottom of the vessel, a shaft which is adapted to be reciprocated in said casing, plates, having openings arranged upon and spaced apart along the length of the shaft and means for reciprocating the shaft, and a valve device which controls the passage of the solids from the casing so that the valve is opened by the pressure of the solids from the discharging means.

2. Apparatus for separating the liquid and solid components of mixtures of liquids and solids, comprising, in combination, a settling vessel, means for removing or discharging the settled solids therefrom including a casing which is in communication with the bottom of the vessel, a shaft which is adapted to be reciprocated in said casing, and plates, having openings, arranged upon and spaced apart along the length of the shaft and a valve device which is yieldingly held in its closed position and adapted to be opened by the pressure of the solids.

3. Apparatus for separating the liquid and solid components of mixtures of liquids and solids, comprising, in combination, a settling vessel, means for removing or discharging the settled solids therefrom including a casing which is in communication with the bottom of the vessel, a shaft which is adapted to be reciprocated in said casing, and plates, having openings, arranged upon and spaced apart along the length of the shaft, and a counter-balanced valve member which operates automatically to close the discharge opening when the pressure of the solids from the discharging means falls below the force operating to keep the valve closed.

4. Apparatus for separating the liquid and solid components of mixtures of liquids and solids, comprising, in combination, a settling vessel, means for removing or discharging the settled solids therefrom including a casing which is in communication with the bottom of the vessel, a shaft which is adapted to be reciprocated in said casing, plates, having openings, arranged upon and spaced apart along the length of the shaft and means, including a weighted oscillating beam, for reciprocating said shaft, and a valve device which controls the passage of the solids from the casing so that the valve is opened by the pressure of the solids from the discharging means.

5. Apparatus for separating the liquid and solid components of mixtures of liquids and solids, comprising, in combination, a settling vessel, means for removing or discharging the settled solids therefrom including a casing which is in communication with the bottom of the vessel, a shaft which is adapted to be reciprocated in said casing, plates, having openings, arranged upon and spaced apart along the length of the shaft and means for reciprocating said shaft, said means including an oscillating weighted beam, means for connecting said beam to the shaft and means for oscillating the beam, said beam being fulcrumed between its points of connection to the shaft and to the oscillating means, and being connected to the oscillating means, between its fulcrum and weight, and a valve device which controls the passage of the solids from the casing so that the valve is opened by the pressure of the solids from the discharging means.

6. Apparatus for separating the liquid and solid components of mixtures of liquids and solids, comprising, in combination, a settling vessel, means for removing or discharging the settled solids therefrom including a casing which is in communication with the bottom of the vessel, a shaft which is adapted to be reciprocated in said casing and plates, having openings, arranged upon and spaced apart along the length of the shaft, and a valve device which controls the passage of the solids from the casing so that the valve is opened by the pressure of the solids from the discharging means, said valve device including a casing, a plunger movable in said casing, counterbalancing means tending to keep said valve closed and a guide for the outer portion of the valve.

7. Apparatus for separating the liquid and solid components of mixtures of liquids and solids, comprising, in combination, a settling vessel, means for removing or discharging the settled solids therefrom including a casing which is in communication with the bottom of the vessel, a shaft which is adapted to be reciprocated in said casing and plates, having openings, arranged upon and spaced apart along the length of the shaft, and a valve device which controls the passage of the solids from the casing so that the valve is opened by the pressure of the solids from the discharging means, said valve device including a casing, a plunger arranged around the shaft, movable in said casing and constructed at its inner end with a knife edge, glands and stuffing boxes between the plunger and casing and plunger and shaft, and a counter-balancing means tending to keep said valve closed.

8. Apparatus for separating the liquid and solid components of mixtures of liquids and solids, comprising, in combination, a settling vessel, means for removing or discharging the settled solids therefrom including a casing which is in communication with the bottom of the vessel, a shaft which is adapted to be reciprocated in said casing, plates, having openings, arranged upon and spaced apart along the length of the shaft, a guide for the end of said shaft and means for reciprocating said shaft, said means including an oscillating weighted beam, the connection between the shaft and beam being made by forming the shaft with a slot and providing a block which is carried by the beam and moves in said slot, and a valve device which controls the passage of the solids from the casing so that the valve is opened by the pressure of the solids from the discharging means.

9. Apparatus for separating the liquid and solid components of mixtures of liquids and solids, comprising, in combination, a settling vessel, means for removing or discharging the settled solids therefrom including a vertical casing which is in communication with the bottom of the vessel, a vertical shaft which is adapted to be reciprocated in said casing, plates, having openings, arranged upon and spaced apart along the length of said shaft, a horizontal casing in communication with said vertical casing, a horizontal shaft which is adapted to be reciprocated in said latter casing, and plates, having openings, arranged upon and spaced apart along the length of said latter shaft, and a valve device combined with said latter casing which controls the passage of the solids from the casing so that the valve is opened by the pressure of the solids from the discharging means.

10. Apparatus for separating the liquid and solid components of mixtures of liquids and solids, comprising, in combination, a settling vessel, means for removing or discharging the settled solids therefrom including a vertical casing which is in communication with the bottom of the vessel, a vertical shaft which is adapted to be reciprocated in said casing, plates, having openings, arranged upon and spaced apart along the length of said shaft, a plurality of horizontal casings in communication with said vertical casing, horizontal shafts which are adapted to be reciprocated in each of said latter casings, plates, having openings, arranged upon and spaced apart along the length of said latter shafts, and a valve device for and combined with each of said latter casings, which controls the passage of the solids from its casing so that the valve is opened by the pressure of the solids from the discharging means.

11. Apparatus for separating the liquid and solid components of mixtures of liquids and solids, comprising, in combination, a settling vessel, means for removing or discharging the settled solids therefrom including a casing which is in communication with the bottom of the vessel, a shaft which is adapted to be reciprocated in said casing and plates, having openings, arranged upon and spaced apart along the length of the shaft, a valve device which controls the passage of the solids from the casing so that the valve is opened by the pressure of the solids from the discharging means, and means positioned in the vessel for promoting settlement of the solids.

12. Apparatus for separating the liquid and solid components of mixtures of liquids and solids, comprising, in combination, a settling vessel having a conical bottom, a shaft which is adapted to be reciprocated in said vessel, perforated discs, gradually decreasing in diameter from the top to the bottom, arranged upon and spaced apart along the length of said shaft, and positioned in the conical bottom portion of the vessel, means for removing or discharging the settled solids from said vessel including a casing which is in communication with the bottom of the vessel, a shaft which is adapted to be reciprocated in said casing and plates, having openings, arranged upon and spaced apart along the length of said latter shaft, and a valve device which controls the passage of the solids from the casing so that the valve is opened by the pressure of the solids from the discharging means, said first-mentioned discs serving for feeding the casing of the discharging means.

13. Apparatus for separating the liquid and solid components of mixtures of liquids and solids, comprising, in combination, a settling vessel having a conical bottom, a shaft which is adapted to be reciprocated in said vessel, perforated discs, gradually decreasing in diameter from the top to the bottom, arranged upon and spaced apart along the length of said shaft, and positioned in the conical bottom of the vessel, means for removing or discharging the settled solids from said vessel including a casing which is in communication with the bottom of the vessel, a shaft which is adapted to be reciprocated in said casing and plates, having openings, arranged upon and spaced apart along the length of said latter shaft, and a valve device which controls the passage of the solids from the casing so that the valve is opened by the pressure of the solids from the discharging means, said first-mentioned discs serving for feeding the casing of the discharging means, and said first-mentioned shaft being connected to the shaft of the discharging means in such a manner as to permit the latter to be moved for a certain distance before the former is moved in either direction.

14. Apparatus for separating the liquid and solid components of mixtures of liquids and solids, comprising, in combination, a settling vessel, means for removing or discharging the settled solids therefrom including a casing which is in communication with the bottom of the vessel, a shaft which is adapted to be reciprocated in said casing and plates, having openings, arranged upon and spaced apart along the length of the shaft, a valve device which controls the passage of the solids from the casing so that the valve is opened by the pressure of the solids from the discharging means, and means positioned in the vessel for promoting settlement of the solids, said means including a vertical shaft which is adapted to be reciprocated and a number of sets or tiers of settlement promoting means, each set or tier comprising a plurality of perforated, inclined, hinged plates connected with the vertical shaft at their lower ends and adapted to slide on supports arranged around the vessel at their upper ends.

15. Apparatus for separating the liquid and solid components of mixtures of liquids and solids, comprising, in combination, a settling vessel, means for removing or discharging the settled solids therefrom including a casing which is in communication with the bottom of the vessel, a shaft which is adapted to be reciprocated in said casing and plates, having openings, arranged upon and spaced apart along the length of the shaft, a valve device which controls the passage of the solids from the casing so that the valve is opened by the pressure of the solids from the discharging means, and means positioned in the vessel for promoting settlement of the solids, said latter means including a vertical shaft which is adapted to be reciprocated and a number of sets or tiers of settlement promoting means, each set or tier comprising a plurality of perforated, inclined, hinged plates connected with the vertical shaft at their lower ends and adapted to slide on supports arranged around the vessel at their upper ends, the means for connecting the perforated, inclined, hinged settling plates to the vertical shaft including perforated horizontal plates fixed around the shaft, rods and distance pieces connecting said latter plates and stays connecting the upper and lower plates to the shaft.

16. Apparatus for separating the liquid and solid components of mixtures of liquids and solids, comprising, in combination, a settling vessel, means for removing or discharging the settled solids therefrom including a casing which is in communication with the bottom of the vessel, a shaft which is adapted to be reciprocated in said casing and plates, having openings, arranged upon and spaced apart along the length of the shaft, a valve device which controls the passage of the solids from the casing so that the valve is opened by the pressure of the solids from the discharging means, means positioned in the vessel for promoting settlement of the solids, said latter means including a vertical shaft which is adapted to be reciprocated and a number of sets or tiers of settlement promoting means, each set or tier comprising a plurality of perforated, inclined, hinged plates connected with the vertical shaft at their lower ends and adapted to slide on supports arranged around the vessel at their upper ends, the means for connecting the perforated, inclined, hinged settling plates to the vertical shaft including perforated horizontal plates fixed around the shaft, rods and distance pieces connecting said latter plates and stays connecting the upper and lower plates to the shaft, said latter shaft being connected to the shaft of the discharging means, and means for reciprocating said shafts.

17. Apparatus for separating the liquid and solid components of mixtures of liquids and solids, comprising, in combination, a settling vessel, means for removing or discharging the settled solids therefrom including a casing which is in communication with the bottom of the vessel, a shaft which is adapted to be reciprocated in said casing and plates, having openings, arranged upon and spaced apart along the length of the shaft, a valve device which controls the passage of the solids from the casing so that the valve is opened by the pressure of the solids from the discharging means, means positioned in the vessel for promoting settlement of the solids, and means positioned between said settlement promoting means and the discharging means for feeding the casing of the discharging means.

In testimony whereof I have signed my name to this specification in the presence of two subscribing witnesses.

ALEXANDER JOHN ARBUCKLE.

Witnesses:
 CHAS. OVENDALE,
 ARTHUR C. A. HARKEY.